United States Patent [19]

Slotosch

[11] Patent Number: 4,722,245
[45] Date of Patent: Feb. 2, 1988

[54] DRIVEN AXLE DIFFERENTIAL PARTICULARLY FOR COMMERCIAL VEHICLES

[76] Inventor: Joachim Slotosch, Tulpenweg 5, D 7991 Eriskirch, Fed. Rep. of Germany

[21] Appl. No.: 915,520
[22] Filed: Oct. 6, 1986
[30] Foreign Application Priority Data Oct. 10, 1985 [DE] Fed. Rep. of Germany ....... 3536195

[51] Int. Cl.⁴ ............................ F16H 1/40; F16H 1/38
[52] U.S. Cl. ......................................... 74/713; 74/710
[58] Field of Search .................................. 74/713, 710

[56] References Cited

U.S. PATENT DOCUMENTS 1,193,709  8/1916  Mennie ................................... 74/713
1,209,007 12/1916  Mennie ................................... 74/713
1,246,155 11/1917  Pillmore ................................. 74/713
1,403,994  1/1922  Wegmann ............................. 74/713

FOREIGN PATENT DOCUMENTS 737667  6/1943  Fed. Rep. of Germany ........ 74/713

Primary Examiner—Dirk Wright
Attorney, Agent, or Firm—McGlew and Tuttle

[57] ABSTRACT

In a driven axle for commercial vehicles, equipped with a differential and two reducing gears, the two reducing gears are directly integrated in the differential and the differential comprises a single stage planetary transmission provided with two sets of differential gears. What this accomplishes is that the axle is of small size and only little space is required for its accommodation. In addition, the power losses are reduced, and a succeeding aggregate can be driven in a simple manner.

11 Claims, 2 Drawing Figures

DRIVEN AXLE DIFFERENTIAL PARTICULARLY FOR COMMERCIAL VEHICLES

FIELD AND BACKGROUND OF THE INVENTION

The invention relates in general to vehicle drive gearing and in particular to a new and useful driven axle for commercial vehicles equipped with a differential and two reducing gears.

Such vehicle axles are known in numerous different embodiments. Their reducing gears, often designed as planetary gears, are accommodated laterally in a separate housing next to the differential, requiring not only much space, but also causing high production costs. Moreover, since three gear units thus participate in the power transmission, high power losses must be tolerated and, if another driven axle or another aggregate follows such a vehicle axle, the drive system must be branched in order to bypass the differential. The arrangement of an axle so designed, therefore, is often associated with difficulties.

SUMMARY OF THE INVENTION

The invention provides a driven axle for commercial vehicles which is of relatively small size and also requires little space so that it can be easily accommodated. In addition, the power losses are to be reduced relative to known axles of the same kind, and it should be easily possible to drive a succeeding aggregate.

According to the invention, this is accomplished in that the two reducing gears are directly integrated in the differential and the differential comprises a single-stage planetary transmission provided with two sets of planetary gears.

It is expedient to form the differential of two drivable sun gears disposed correspondingly on a shaft having an axis parallel to the vehicle wheels; planetary gears as driven members, meshing with the sun gears and each interconnected on both sides by a web; and hollow gears meshing with the planetary gears and supported in twistably mounted differential gears disposed perpendicular to the axes of the sun gears.

Furthermore, the webs supporting the planetary gears are in driving connection with the vehicle wheels; the differential gears are twistably mounted in the housing accommodating the differential, and/or on shafts retained in the differential and the sun gears, the hollow gears, the planetary gears and the differential gears are all bevel gears, it being recommendable to mount the hollow gears rotatably on the shafts associated with the sun gears within the differential.

To drive the two sun gears there may be provided in a simple manner within the differential a set of bevel gears, one of which is fixed to and corotates with a drive shaft penetrating one of the differential gears centrally while the other bevel gear is mounted on a shaft which connects and drives the two sun gears.

According to a further development, a drive shaft, on which are mounted within the differential housing two bevel gears disposed opposite each other and in driving connection with the bevel gears mounted on the shafts supporting the sun gears. The drive shaft penetrates the two different gears centrally or offset relative to their axis of rotation to drive a succeeding axle or a succeeding transmission.

The driven axle for commercial vehicles designed in accordance with the invention is simple in its design and thus can be produced economically and is small in relation to comparable vehicle axles, with less power loss than they involve. For, if the two reducing gears are directly integrated in the differential, and if the latter is designed as single stage planetary transmission provided with two sets of gears, separate housings for the reducing gears are no longer needed so that both the structural costs and the space requirements are reduced. Moreover, since only one transmission unit is still participating in the power transmission, the power losses can be kept small. It is also of advantage that a drive shaft can penetrate without problems the differential designed in accordance with the invention so that a succeeding aggregate can be driven without problems and without having to provide drive bypasses.

Accordingly it is an object of the invention to provide an improved driven axle for commercial vehicles in which a drive shaft may be connected into a differential housing at one side thereof for drive vehicle wheel axles which are rotatably mounted substantially perpendicularly thereto or in which the drive shaft may be passed completely through the differential to another wheel axle housing.

A further object of the invention is to provide a differential which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
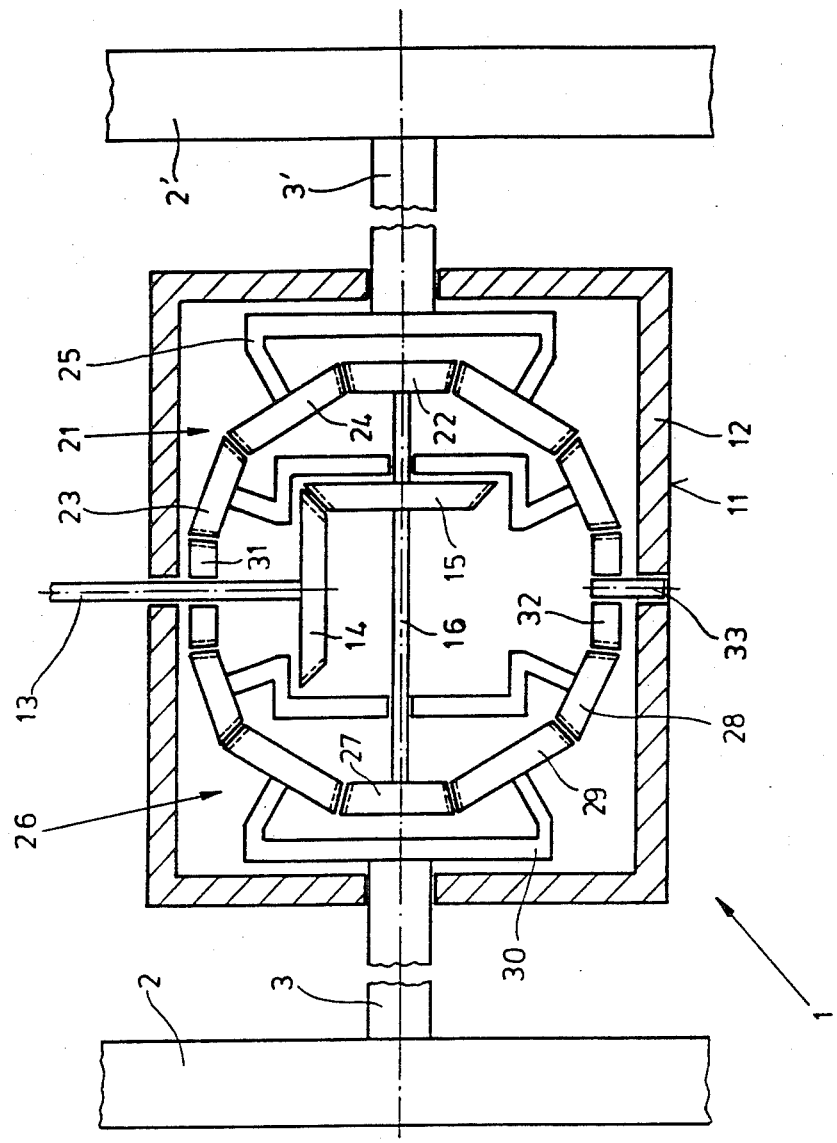
FIG. 1 is a partial and sectional view of the commercial vehicle axle provided with a differential constructed in accordance with the invention.

Referring to the drawings, in particular the invention as embodied therein in FIG. 1 includes a differential 11 which has a housing 12 with axles 3, 3 of wheels 2, 2 which are rotatably supported in the housing at respective opposite ends thereof. In accordance with the invention, as shown in FIG. 1, a drive shaft 13 is rotatably supported in the side of the housing and it drives a sun gear shaft 16 through bevel gear means 14 and 15. The sun gear shaft 16 carries a sun gear 22 and 27 at respective opposite ends which drive planetary gearings 21, 26 respectively.

Figure 2:
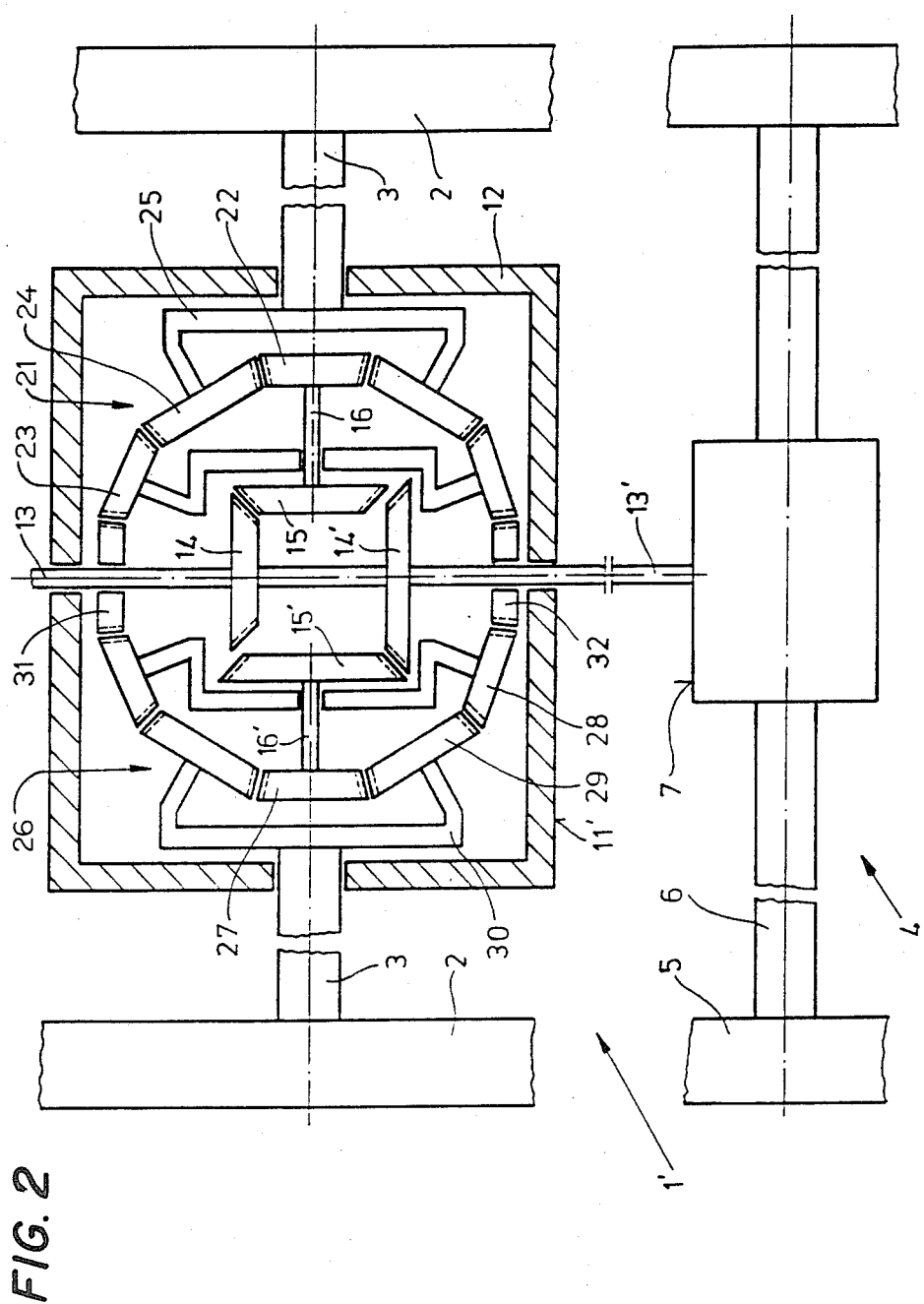
FIG. 2 is a view similar to FIG. 1 but of another embodiment with another vehicle axle succeeding the first.

The driven axle of a commercial vehicle, shown in FIGS. 1 and 2 and marked 1 and 1', respectively, comprises a differential 11, 11' and vehicle wheels 2,2', or 2,2 mounted on respective shafts 3,3' 3,3', as the case may be, the drive energy being transmitted to each of the corresponding vehicle wheels 2 or 2' by a drive shaft 13 via the differential 11, 11'. The differential 11, 11' comprises a planetary transmission provided with two sets of planetary differential gears 21 and 26 in which reducing gears are thus integrated.

Each one of the two sets of planetary differential gears 21 and 26 comprises a sun gear 22, 27, a hollow gear 23, 28 and, disposed between them, planetary gears, 24, 29 which are in driving connection with the shafts 3, 3' via a web 25,30. The hollow gears 23 and 28 are supported in differential gears 31 and 32 which are rotatably mounted on the drive shaft 13 and on a shaft 33 accommodating the differential 11, as shown in FIG. 1, or in the case of differential gear 32 on a drive shaft 13' portion penetrates the differential 11' shown in FIG. 2.

In the embodiment according to FIG. 1, two bevel gears 14 and 15 are provided to drive the sun gears 22 and 27, the bevel gear 14 being mounted on and corotating with the drive shaft 13, and the bevel gear 15, meshing with the bevel gear 14, and on a shaft 16 which supports the sun gears 22 and 27 and on which the hollow gears 23 and 28 are also rotatably mounted.

In the embodiment according to FIG. 2, on the other hand, planetary differential gears 21' and 26' include two bevel gears 14 and 14' mounted on the shaft 13 which mesh with bevel gears 15 and 15' mounted on shafts 16,16' which support the sun gears 22 and 27. In this manner, the portion of shaft 13, as drive shaft 13' of a succeeding vehicle axle 4, can be made to penetrate the differential 11'. The vehicle axle 4 is also formed of vehicle wheels 5 mounted on shafts 6 and of a differential or distribution transmission 7, into which the drive shaft 13' is introduced and which may also be offset by a given angle relative to the differential gears 31, 32.

Both sun gears 22 and 27 are driven jointly, and the drive energy is absorbed by the planetary gears 24 and 29 meshing with them and is fed via their webs 25 and 30 and the shafts 3 fixed to them to the vehicle wheels 2 because the hollow gears 23 and 28 meshing with the differential gears and thus being supported in them are normally standing still. But if there is a need to compensate, i.e. when negotiating a curve, the differential gears 31 and 32 are turned slightly relative to each other, thus making it possible to increase the rotary speed of the web 25 while reducing that of the web 30 so that speed difference originate at the vehicle wheels 2 and a compensation takes place automatically.

While specific embodiments of the invention have been shown and described in detail to illustrate the application of the principles of the invention, it will be understood that the invention may be embodied otherwise without departing from such principles.

What is claimed is:

1. A drive axle for vehicle, comprising a differential housing, a vehicle having wheel axles rotatably supported at respective opposite ends of said housing, a drive shaft rotatably supported in said housing at substantially right angles to said axles, a sun shaft extending substantially coinsident to said wheel axles in said housing and having a sun gear affixed to each end for rotation therewith, a driven planetary gear set engaging each sung ear and having a web portion extending to each side of said sun gear and being connected at opposite sides of respective ones of said axles, a hollow gear in meshing engagement with each planetary gear of each respective sun gear, a differential gear rotatably mounted in said housing substantially perpendicular to the axis of said sun gear and in meshing enagement with and supporting said planetary gears, and bevel gear means between said drive shaft and said sun gear shaft driving said sun gear shaft from said drive shaft.

2. A drive axle according to claim 1, wherein said drive shaft is rotatably supported on only one end of said housing and includes a bevel gear affixed thereto, said sun gear shaft having a bevel gear in driving engagement with the bevel gear of said drive shaft and comprising said bevel gear means.

3. A drive axle according to claim 1, wherein said drive shaft is journalled in each end of said housing and extends through said housing.

4. A drive axle according to claim 3, wherein said bevel gear means includes a bevel gear affixed at spaced locations to said drive shaft, said sun gear shaft having two portions one extending on each side of said drive shaft and each having a bevel gear in meshing engagement with a bevel gear on said drive shaft.

5. A drive axle according to claim 1, wherein said hollow gear includes a hollow central portion, said bevel gear means including a bevel gear on said sun gear shaft arranged within said hollow central portion.

6. A driven axle for commercial vehicles, comprising a differential housing containing a differential and two reducing gears integrated in the differential, the differential having a single stage planetary transmission provided with two sets of gears including integrated reducing gears, the sets comprising driven planetary gears for driving a corresponding vehicle wheel axle and drivable sun gears disposed on a sun gear shaft having an axis coincident to the vehicle wheel axles, the planetary gears being engaged in the corresponding sun gears and having a web interconnected on both sides of the planetary gears, a hollow gear meshing with the planetary gears of each set, and a pair of differential gears rotatably mounted in the housing perpendicular to the axis of the sun gears and supporting the planetary gears.

7. Axle of claim 6 wherein the webs of the planetary gears are connected to the axles of the vehicle wheels.

8. Axle of claim 6 wherein the differential gears are rotatably mounted on a drive shaft in the housing, and rotatably support and engage respective hollow gears.

9. Axle of claim 8 including a hollow gear rotatably mounted on the sun gear shaft and in meshing engagement between the differential gears and the planetary gears of a said set.

10. Axle of claim 9 wherein the hollow gears are rotatably mounted within the housing on respective sun gear shaft portions.

11. Axle of claim10 wherein the drive shaft extends completely through the housing and has at least one bevel gear thereon driving the sun gear shaft.

* * * * *